United States Patent
Koga

(10) Patent No.: US 9,760,148 B2
(45) Date of Patent: Sep. 12, 2017

(54) APPARATUS AND METHOD FOR RESUMING THE APPARATUS FROM A POWER-SAVING STATE BASED ON A PORT NUMBER OF A RECEIVED SPECIFIC PACKET OR A CONTENT OF THE RECEIVED SPECIFIC PACKET

(71) Applicant: CANON KABUSHIKI KAISHA, Tokyo (JP)

(72) Inventor: Kazuhiro Koga, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 14/717,191

(22) Filed: May 20, 2015

(65) Prior Publication Data
US 2015/0338895 A1    Nov. 26, 2015

(30) Foreign Application Priority Data
May 26, 2014 (JP) ................. 2014-108004

(51) Int. Cl.
G06F 1/26 (2006.01)
G06F 1/32 (2006.01)
H04L 29/12 (2006.01)
H04W 80/06 (2009.01)
H04W 52/02 (2009.01)
H04L 29/08 (2006.01)

(52) U.S. Cl.
CPC .......... *G06F 1/3209* (2013.01); *G06F 1/3284* (2013.01); *G06F 1/3287* (2013.01); *H04L 61/2517* (2013.01); *H04L 67/1014* (2013.01); *H04W 52/028* (2013.01); *H04W 80/06* (2013.01); *Y02B 60/1267* (2013.01)

(58) Field of Classification Search
CPC .......... H04L 61/2517; H04L 67/1014; H04W 80/06; H04W 52/028; G06F 1/3287; G06F 1/3284
See application file for complete search history.

(56) References Cited

U.S. PATENT DOCUMENTS

| 7,809,966 B2 | 10/2010 | Imao | |
| 2002/0083351 A1* | 6/2002 | Brabenac | H04L 43/028 713/300 |
| 2010/0115302 A1* | 5/2010 | Cho | G06F 1/3203 713/310 |
| 2010/0250978 A1* | 9/2010 | Nakamura | G06F 1/3209 713/300 |

(Continued)

FOREIGN PATENT DOCUMENTS

JP     2007183797 A    7/2007

*Primary Examiner* — Xuxing Chen
(74) *Attorney, Agent, or Firm* — Rossi, Kimms & McDowell LLP

(57) ABSTRACT

An information processing apparatus capable of sufficiently saving power consumption. A receiving unit receives a packet transmitted from an external device. An identifying unit identifies an application which is to execute processing of the packet on a basis of a port number of the packet received by the receiving unit. The application identified by the identifying unit analyzes a content of the packet, identifies a unit required for executing processing of the packet, and issues an instruction to supply power to the unit.

7 Claims, 8 Drawing Sheets

(56) References Cited

U.S. PATENT DOCUMENTS

| | | | |
|---|---|---|---|
| 2013/0311809 A1* | 11/2013 | Sood | G06F 1/3209 |
| | | | 713/323 |
| 2013/0346775 A1* | 12/2013 | Srivastava | G06F 1/3215 |
| | | | 713/323 |
| 2014/0359167 A1* | 12/2014 | Balasubramanian | H04L 29/06095 |
| | | | 709/250 |

* cited by examiner

FIG. 3

| POWER MODE | CONTROLLER 103 | PRINTER DEVICE 104 | SCANNER DEVICE 102 | IMAGE PROCESSING UNIT 105, FAX DEVICE 107, OPERATION SECTION 108 |
|---|---|---|---|---|
| NORMAL MODE | ON | ON | ON | ON |
| POWER SAVING MODE 1 | ON | ON | OFF | ON |
| POWER SAVING MODE 2 | ON | OFF | ON | ON |
| POWER SAVING MODE 3 | ON | OFF | OFF | ON |
| POWER SAVING MODE 4 | ON | OFF | OFF | OFF |
| POWER SAVING MODE 5 | OFF | OFF | OFF | OFF |

| ID | RECEPTION PORT NUMBER | APPLICATION | ELECTRIFICATION AVAILABILITY JUDGMENT | THE NUMBER OF ELECTRIFICATION PATTERNS | ELECTRIFICATION PATTERN |
|---|---|---|---|---|---|
| 401 | 402 | 403 | 404 | 405 | 406 |
| 1 | 9100 | PRINT JOB CONTROL SECTION | NO | 1 | POWER SAVING MODE 1 |
| 2 | 80 | WEB SERVER | NO | 5 | POWER SAVING MODE 1<br>POWER SAVING MODE 2<br>POWER SAVING MODE 3<br>POWER SAVING MODE 4<br>NORMAL MODE |
| 3 | 5060 | FAX JOB CONTROL SECTION | NO | 1 | POWER SAVING MODE 1 |
| 4 | 161 | SNMP AGENT | YES | 5 | POWER SAVING MODE 1<br>POWER SAVING MODE 2<br>POWER SAVING MODE 3<br>POWER SAVING MODE 4<br>NORMAL MODE |

215

| ID | MIB CLASSIFICATION | ELECTRIFICATION PATTERN |
|---|---|---|
| 1 | PRINTER MIB | POWER SAVING MODE 1 |
| 2 | IF MIB | POWER SAVING MODE 4 |
| 3 | VENDER UNIQUE MIB (FAX) | POWER SAVING MODE 3 |
| 4 | VENDER UNIQUE MIB (SCANNER) | POWER SAVING MODE 2 |

216

PRIORITY MODE SETTING SCREEN

601 — ○ PROCESSING PRIORITY MODE
602 — ● POWER SAVING PRIORITY MODE

603 SETTING  604 CANCEL

600

APPARATUS AND METHOD FOR RESUMING THE APPARATUS FROM A POWER-SAVING STATE BASED ON A PORT NUMBER OF A RECEIVED SPECIFIC PACKET OR A CONTENT OF THE RECEIVED SPECIFIC PACKET

BACKGROUND OF THE INVENTION

Field of the Invention

The present invention relates to an information processing apparatus, a control method therefor, and a storage medium.

Description of the Related Art

A recent information processing apparatus has multiple power modes, and the power modes include a normal mode in which all the hardware included in the information processing apparatus is electrified, a so-called sleep mode and a power saving mode such as a partial electrification mode in which a part of the hardware included in the information processing apparatus is electrified. When the information processing apparatus in the normal mode is not used for a predetermined time, the power mode transitions from the normal mode to the sleep mode in order to save power consumption. For example, when the information processing apparatus which has transitioned to the sleep mode is requested to perform, for example, packet communication, the power mode transitions from the sleep mode to the normal mode or the partial electrification mode.

By the way, there is known an application apparatus which, when the power mode transitions from the sleep mode to the partial electrification mode, determines hardware for which electrification is to be resumed, on the basis of a reception TCP port number for packet communication and information acquired from the reception TCP port number (see, for example, Japanese Laid-Open Patent Publication (Kokai) No. 2007-183797).

However, though the kind of hardware that requires electrification in order to respond to the communication content of packet communication varies depending on the communication content, hardware for which electrification is to be resumed is determined on the basis of a reception TCP port number and information acquired from the reception TCP port number in the application apparatus of the Japanese Laid-Open Patent Publication (Kokai) No. 2007-183797. That is, there may be a case where electrification is resumed not only for hardware used in order to respond to the communication content of packet communication but for hardware not used because of little information for determining hardware for which electrification is to be resumed, and, therefore, it cannot be said that power consumption is sufficiently saved.

SUMMARY OF THE INVENTION

The present invention provides an information processing apparatus capable of sufficiently saving power consumption, a control method therefor, and a storage medium.

Accordingly, the present invention provides an information processing apparatus, comprising a receiving unit configured to receive a packet transmitted from an external device, and an identifying unit configured to identify an application which is to execute processing of the packet on a basis of a port number of the packet received by the receiving unit, wherein the application identified by the identifying unit analyzes a content of the packet to identify a unit required for executing the processing of the packet, and issues an instruction to supply power to the unit.

According to the present invention, if multiple electrification patterns are set for a received packet, a power mode in which components required for executing processing of the packet are electrified is identified by analyzing the content of the received packet. Thereby, it is possible to sufficiently save power consumption.

Further features of the present invention will become apparent from the following description of exemplary embodiments (with reference to the attached drawings).

BRIEF DESCRIPTION OF THE DRAWINGS

FIG. 3 is a diagram used to explain an electrification management table in FIG. 2.

FIG. 4 is a diagram used to explain an electrification pattern table in FIG. 2.

DESCRIPTION OF THE EMBODIMENTS

An embodiment of the present invention will be described below in detail with reference to the drawings.

Figure 1:
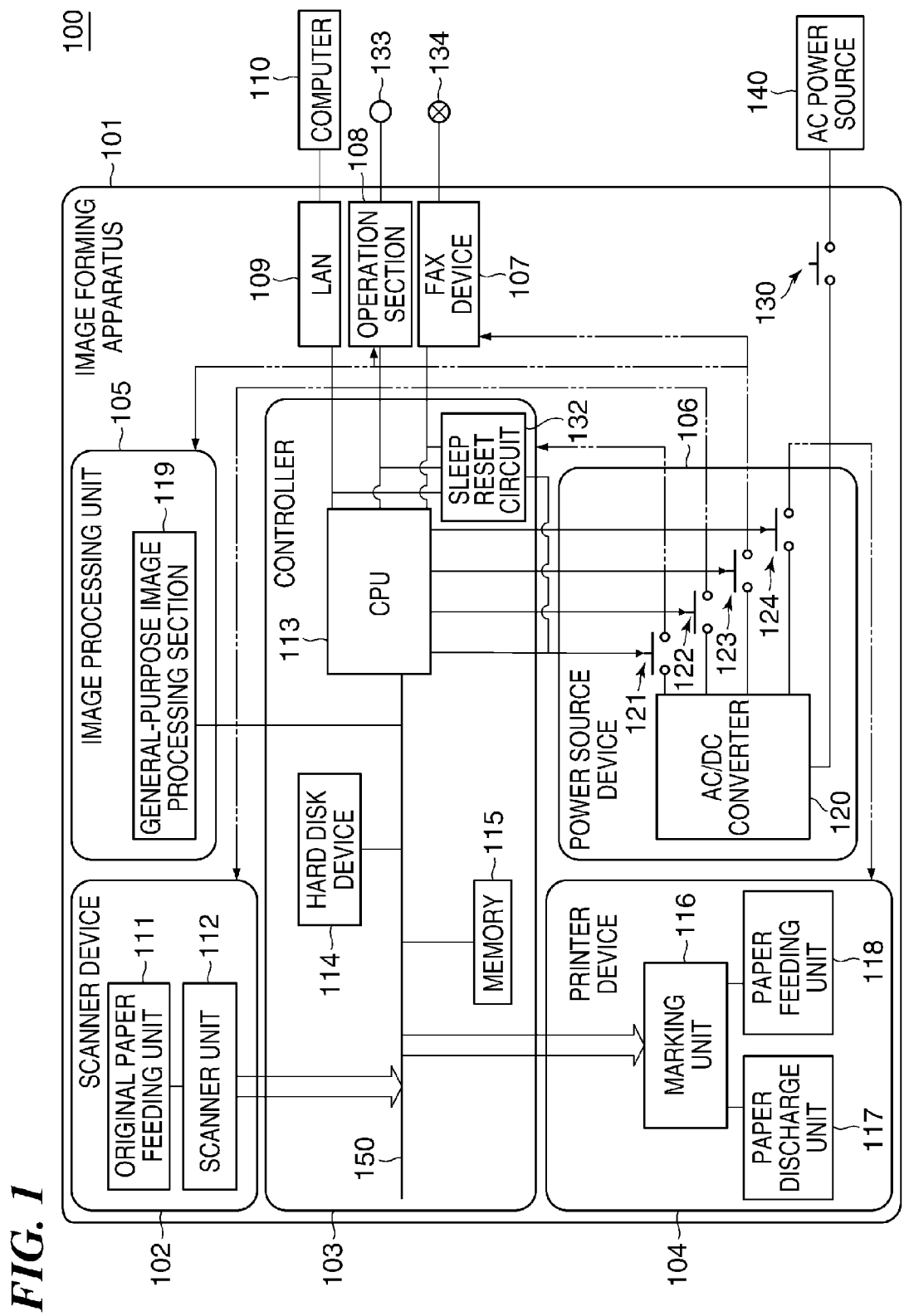
FIG. 1 is a block diagram schematically showing a configuration of an image forming system that includes an image forming apparatus as an information processing apparatus according to an embodiment of the present invention.

FIG. 1 is a block diagram schematically showing a configuration of an image forming system 100 that includes an image forming apparatus 101 as an information processing apparatus according to the embodiment of the present invention.

The image forming system 100 in FIG. 1 is provided with the image forming apparatus 101, a computer 110, a sleep reset button 133, a telephone line 134 and an AC power source 140. The image forming apparatus 101 is provided with a scanner device 102, a controller 103, a printer device 104, an image processing unit 105, a power source device 106, a FAX device 107, an operation section 108, a LAN 109 and a switch 130.

The scanner device 102 has an original paper feeding unit 111 and a scanner unit 112. The controller 103 has a CPU 113, a hard disk device 114, a memory 115 and a sleep reset circuit 132. The printer device 104 has a marking unit 116, a paper discharge unit 117 and a paper feeding unit 118. The image processing unit 105 has a general-purpose image processing section 119. The power source device 106 has an AC/DC converter 120 and switches 121 to 124.

The original paper feeding unit 111 is connected to the scanner unit 112. The paper discharge unit 117 and the paper feeding unit 118 are connected to the marking unit 116. The AC/DC converter 120 is connected to the CPU 113 via the switches 121 to 124 and connected to the AC power source 140 via the switch 130.

The FAX device 107, the operation section 108 and the LAN 109 are connected to the telephone line 134, the sleep reset button 133 and the computer 110, respectively, and connected to the CPU 113. The scanner unit 112, the CPU 113, the hard disk device 114, the memory 115, the marking unit 116 and the general-purpose image processing section 119 are connected to one another via a bus 150.

The original paper feeding unit 111 carries original paper to the scanner unit 112, and the scanner unit 112 optically reads the carried original paper and generates image data. The image data is temporarily stored in the memory 115 and, after that, stored in the hard disk device 114. The marking unit 116 prints the image data stored in the hard disk device 114 on recording paper fed from the paper feeding unit 118. The recording paper on which the image data is printed is discharged to the paper discharge unit 117. The general-purpose image processing section 119 performed enlargement, reduction and the like of the image data.

The FAX device 107 performs transmission/reception of data to/from an external apparatus (not shown) via the telephone line 134. The operation section 108 is used when a user inputs an instruction to the image forming apparatus 101. The LAN 109 is a network interface device connecting the computer 110 and the CPU 113, and any one of a wired LAN and a wireless LAN is used. Further, the LAN 109 is a LAN controller compatible with WOL (Wake On LAN) and includes a CPU, a nonvolatile memory and a RAM (which are not shown). It should be noted that, in addition to the LAN 109, a communication interface such as a USB may be used as a network interface device.

The CPU 113 controls the image forming apparatus 101. The hard disk device 114 is a nonvolatile storage device and stores, for example, image data generated by the scanner device 102. It should be noted that, in addition to the hard disk device 114, a nonvolatile memory or the like may be used as a nonvolatile storage device. Upon detecting that the image forming apparatus 101 to which a sleep mode is applied has been requested to perform packet communication, the sleep reset circuit 132 supplies power to the controller 103.

The AC/DC converter 120 converts supplied AC power to DC power, and the DC power is supplied to each of the components, the scanner device 102, the controller 103, the printer device 104, the image processing unit 105, the FAX device 107 and the operation section 108 via the switches 121 to 124, and each component supplied with the DC power is electrified. It should be noted that, though the DC power supplied to the image processing unit 105, the FAX device 107 and the operation section 108 is simultaneously controlled by the switch 123, the DC power supplied to each of the image processing unit 105, the FAX device 107 and the operation section 108 may be independently controlled.

Further, it may be all the components included in the image forming apparatus 101 or may be a part of the components included in the image forming apparatus 101 that are simultaneously electrified in the image forming apparatus 101. The components that are simultaneously electrified are determined according to power modes. The power modes include a normal mode and a power saving mode. Furthermore, the power saving mode includes a sleep mode, a standby mode, a partial electrification mode and the like, and these modes can be switched thereamong.

In the normal mode, all the components included in the image forming apparatus 101 are electrified. In the sleep mode, portions which detect a job, for example, the FAX device 107, the operation section 108, the LAN 109, the memory 115 and the sleep reset circuit 132 are electrified, and power consumption of the image forming apparatus 101 is suppressed. In the standby mode, the controller 103 is electrified, and power consumption of the image forming apparatus 101 is suppressed. In the partial electrification mode, components to be electrified are changed according to the kind of a job.

Specifically, in the partial electrification mode, the scanner device 102 and the printer device 104 are electrified at the time of copying original paper; the scanner device 102 is electrified at the time of reading original paper and storing an image of the read original paper into the hard disk device 114; the printer device 104 is electrified at the time of printing document data; the printer device 104 and the FAX device 107 are electrified at the time of printing a received FAX; the scanner device 102 and the FAX device 107 are electrified at the time of transmitting a FAX; the image processing unit 105 and the FAX device 107 are electrified at the time of transferring a received FAX; and the controller 103 and the FAX device 107 are electrified at the time of storing a received FAX into the memory 115 without printing the FAX.

Figure 2:
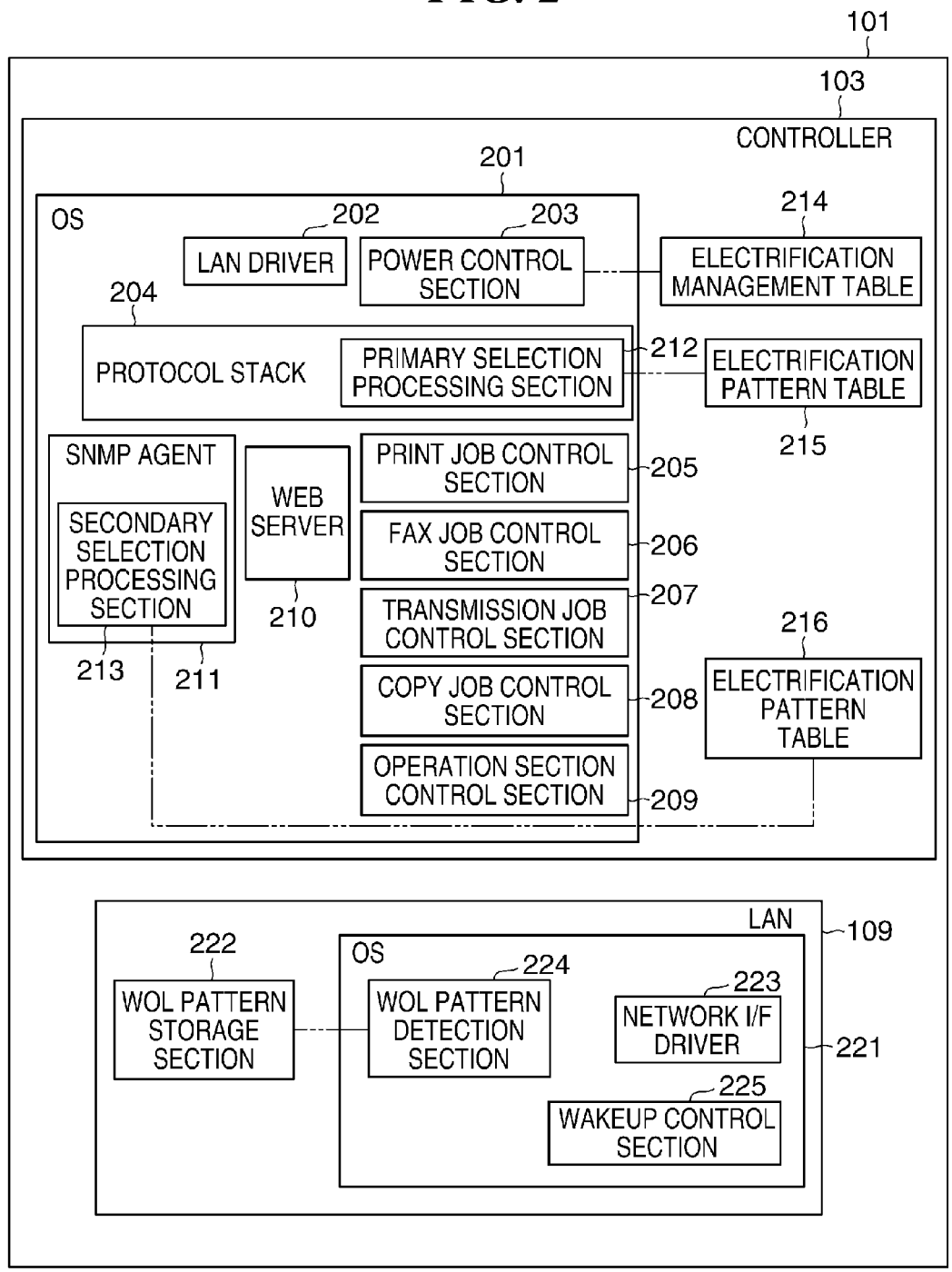
FIG. 2 is a block diagram schematically showing configurations of software of a controller and a LAN in FIG. 1.

FIG. 2 is a block diagram schematically showing configurations of software of the controller 103 and the LAN 109 in FIG. 1.

In FIG. 2, the controller 103 has an OS 201; the OS 201 has a LAN driver 202, a power control section 203, a protocol stack 204, a print job control section 205, a FAX job control section 206, a transmission job control section 207, a copy job control section 208, an operation section control section 209, a web server 210, an SNMP (Simple Network Management Protocol) agent 211, an electrification management table 214, an electrification pattern table 215 and an electrification pattern table 216; the protocol stack 204 has a primary selection processing section 212; and the SNMP agent 211 has a secondary selection processing section 213.

Further, in FIG. 2, the LAN 109 has an OS 221 and a WOL pattern storage section 222, and the OS 221 has a network I/F driver 223, a WOL pattern detection section 224 and a wakeup control section 225.

In the controller 103, the LAN driver 202 controls the LAN 109. The power control section 203 controls the switches 121 to 124 and also controls an electrification state of the image forming apparatus 101 on the basis of the electrification management table 214 (see FIG. 3). The protocol stack 204 receives print data from the computer 110 and transmits an image file to the computer 110 via the LAN 109 in accordance with a communication protocol, for example, TCP/IP or the like.

The print job control section 205 controls the printer device 104 at the time of printing print data received via the LAN 109. The FAX job control section 206 controls the printer device 104 and the FAX device 107 at the time of printing FAX data received via the FAX device 107, and controls the FAX device 107 at the time of transmitting FAX data.

The transmission job control section 207 controls the scanner device 102 when image data generated by the scanner device 102 is transmitted to the computer 110. The copy job control section 208 controls the scanner device 102 and the printer device 104 when original paper is read to generate image data and the image data is printed. The operation section control section 209 controls the operation section 108.

The web server 210 operates when the user checks the state of the image forming apparatus 101 or change the settings of the image forming apparatus 101 via a web browser on the computer 110. When an SNMP server (not shown) operates on the computer 110 and requests MIB (Management Information Base) information, which is information about the image forming apparatus 101, from the image forming apparatus 101, the SNMP agent 211 transmits the MIB information to the SNMP server.

The primary selection processing section 212 extracts a power mode to be used when the image forming apparatus 101 executes processing of a received packet, on the basis of the electrification pattern table 215 (see FIG. 4). Further, when it is necessary to execute a secondary selection process in FIG. 9 to be described later, the primary selection processing section 212 instructs the secondary selection processing section 213 to execute the secondary selection process. When being instructed by the primary selection processing section 212 to execute the secondary selection process, the secondary selection processing section 213 identifies a power mode to be used, on the basis of the electrification pattern table 216 (see FIG. 5).

In the LAN 109, the WOL pattern storage section 222 stores multiple WOL patterns each of which is constituted by a pair of an IP address of the image forming apparatus 101 (hereinafter referred to as a "reception IP address") and a port number of the image forming apparatus 101 (hereinafter referred to as a "reception port number"). The network I/F driver 223 detects whether or not a packet has been received via the LAN 109.

The received packet is constituted by a header section and a data section, and the IP address of the image forming apparatus 101 (hereinafter referred to as a "destination IP address") and the port number of the image forming apparatus 101 (hereinafter referred to as a "destination port number") are stored in the header section. It should be noted that, even if a packet is not provided with the header section, the destination IP address and the destination port number can be stored in the data section.

The WOL pattern detection section 224 detects whether or not a destination IP address and a destination port number stored in the header section of a packet received via the LAN 109 correspond to any of the multiple WOL patterns stored in the WOL pattern storage section 222, each of which WOL patterns is constituted by a pair of a reception IP address and a reception port number. When the destination IP address and the destination port number corresponding to a reception IP address and a reception port number constituting a WOL pattern is detected, the wakeup control section 225 outputs an electrification resumption signal for resuming electrification of the image forming apparatus 101, to the sleep reset circuit 132.

FIG. 3 is a diagram used to explain the electrification management table 214 in FIG. 2.

The electrification management table 214 in FIG. 3 is stored in the hard disk device 114, and the CPU 113 controls electrification states of the components of the image forming apparatus 101 on the basis of the electrification management table 214.

In FIG. 3, the electrification management table 214 includes six power modes, that is, the normal mode and five power saving modes 1 to 5. When each power mode is applied to the image forming apparatus 101, it is recorded whether or not to electrify each of the components of the image forming apparatus 101, specifically, each of the scanner device 102, the controller 103, the printer device 104, the image processing unit 105, the FAX device 107 and the operation section 108. Specifically, for a certain component, "ON" is recorded if the component is to be electrified, and "OFF" is recorded if the component is not to be electrified.

In the normal mode, all the components of the image forming apparatus 101 are electrified. Therefore, when the image forming apparatus 101 receives a packet, processing of the packet can be executed quickly irrespective of the kind of the packet. In the power saving modes 1 to 4, at least one of the components of the image forming apparatus 101 is not electrified. Therefore, by switching among the power saving modes 1 to 4 according to the content of a packet, processing of the packet can be executed with the minimum power consumption. The power consumption mode 5 is a so-called sleep mode, and none of the components of the image forming apparatus 101 is electrified. Therefore, power consumption is the lowest, and power consumption can be effectively saved when the image forming apparatus 101 is not used for a long time.

FIG. 4 is a diagram used to explain the electrification pattern table 215 in FIG. 2.

The electrification pattern table 215 in FIG. 4 includes items of ID 401, reception port number 402, application 403, electrification availability judgment 404, the number of electrification patterns 405 and electrification pattern 406. The ID 401 to the electrification pattern 406 are set for each packet the image forming apparatus 101 receives.

The ID 401 is a reception number which is sequentially given to a packet received by the image forming apparatus 101. The reception port number 402 is an element of a WOL pattern, and it is an identification number identifying an application 403 which executes processing of a packet the image forming apparatus 101 receives. That is, an application 403 which executes processing of the packet is identified from the reception port number 402. The number of electrification patterns 405 is the number of power modes which may be possibly used at the time of executing the application 403, and the electrification pattern 406 shows specific power modes which may be possibly used at the time of executing the application 403.

For example, if an application 403 realizes one function, one power mode is set for the application 403. If an application 403 realizes multiple functions (in the case where the web server as an application 403 performs printing and FAX communication), multiple power modes corresponding to the functions are set for the application 403.

It should be noted that, in the present embodiment, correspondence relationships between the applications 403 and the electrification patterns 406 are stored in advance, and, when a packet is received, and an application 403 which executes processing of the packet is identified from the reception port number 402, an electrification pattern 406 corresponding to the application 403 is set on the basis of the above correspondence relationships.

The electrification availability judgment 404 indicates whether or not an application 403 can judge components of the image forming apparatus 101 required for executing processing of a packet. If the application 403 can judge the necessary components, "YES" is recorded. If not, "NO" is recorded.

That is, in the present embodiment, if the electrification availability judgment 404 is "YES", components required for executing processing of a packet can be judged. Since components to be electrified are set for each mode as shown in the electrification management table 214 in FIG. 3, a power mode which is optimal for executing processing of the packet can be identified from an electrification pattern 406 by comparing the components judged to be required for executing processing of the packet with the electrification management table 214.

Here, the optimum power mode is such a power mode that the degree of correspondence between components required for executing processing of a packet and components electrified in the power mode is high, that is, a power mode in which the minimum components required for executing processing of the packet are electrified. In this mode, unnecessary components are not electrified, and it is a power mode which minimizes power consumption.

Figures 5, 6:
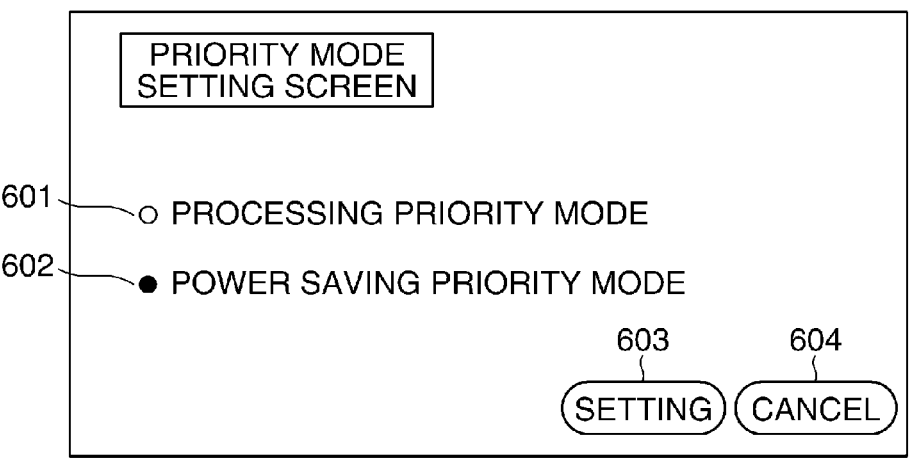
FIG. 5 is a diagram used to explain the electrification pattern table in FIG. 2.
FIG. 6 is a diagram used to explain a priority mode setting screen set via an operation section in FIG. 1.

FIG. 5 is a diagram used to explain the electrification pattern table 216 in FIG. 2.

The electrification pattern table 216 in FIG. 5 has items of ID 501, MIB classification 502 and electrification pattern 503. The ID 501 to the electrification pattern 503 are set for each packet for which the electrification availability judgment 404 is "YES" and the number of electrification patterns 405 is two or larger in the electrification pattern table 215 in FIG. 4.

The ID 501 is a reception number sequentially given to a packet for which the electrification availability judgment 404 is "YES" and the number of electrification patterns 405 is two or larger. The MIB classification 502 is acquired by analyzing MIB information stored in the data section of a received packet and is used at the time of identifying an application 403 which executes processing of the packet.

The electrification pattern 503 is the optimum power mode among multiple power modes which may be possibly used at the time of executing the application 403 identified on the basis of the MIB classification 502. It should be noted that, in the present embodiment, correspondence relationships between the MIB classifications 502 and the applications 403 to be identified are stored in advance.

That is, in the present embodiment, it is possible to identify the optimum electrification pattern at the time of executing processing of a packet, by using the electrification pattern table 216 in FIG. 5.

FIG. 6 is a diagram used to explain a priority mode setting screen set via the operation section 108 in FIG. 1.

A priority mode setting screen 600 in FIG. 6 has radio buttons 601 and 602, a setting button 603 and a cancel button 604.

When the radio button 601 is selected, a processing priority mode in which priority is given to processing of a packet over analysis of the content of the packet is applied to the image forming apparatus 101. When the radio button 602 is selected, a power saving priority mode in which priority is given to analysis of the content of a packet over processing of the packet is applied to the image forming apparatus 101. The setting button 603 is pressed down at the time of determining on the content of setting, and the cancel button 604 is pressed down at the time of canceling setting.

When the processing priority mode is applied to the image forming apparatus 101, components of the image forming apparatus 101 are electrified on the basis of a power mode shown as an electrification pattern 406 without comparing components judged to be required for executing processing of a packet with the electrification management table 214 even if the electrification availability judgment 404 for the packet for which the processing is to be executed is "YES". Especially, when multiple power modes are shown as an electrification pattern 406, a power mode in which the largest number of components are electrified is used.

When the power saving priority mode is applied to the image forming apparatus 101, components of the image forming apparatus 101 are electrified on the basis of the optimum power mode after the secondary selection process in FIG. 9 to be described later ends.

Since it is possible to select any of the processing priority mode in which priority is given to processing of a packet over analysis of the content of the packet and the power saving priority mode in which priority is given to analysis of the content of a packet over processing of the packet in the priority mode setting screen 600 in FIG. 6, it is possible to improve user convenience in using the information processing apparatus by selecting any of the priority modes according to demands, such as demands by multiple users, a demand for processing a packet early, a demand for suppressing power consumption and the like.

Figure 7:
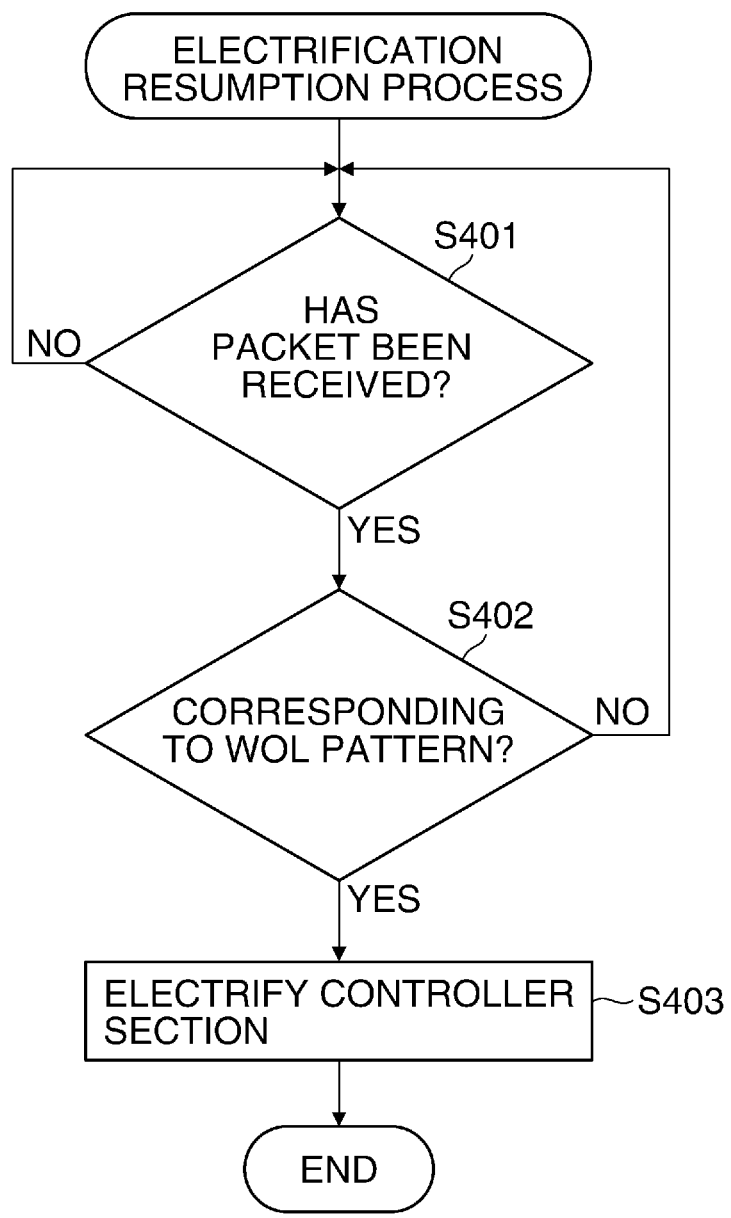
FIG. 7 is a flowchart showing a procedure for an electrification resumption process executed by the LAN in FIG. 2.

FIG. 7 is a flowchart showing a procedure for an electrification resumption process executed by the LAN 109 in FIG. 2.

The electrification resumption process in FIG. 7 is executed when the LAN 109 receives a packet. In FIG. 7, the LAN 109 judges whether a packet has been received or not first (step S401). When a packet has not been received, the process returns to step S401. On the other hand, when a packet has been received, the LAN 109 judges whether or not the destination IP address and destination port number of the packet correspond to any of the multiple WOL patterns stored in the WOL pattern storage section 222, each of which WOL patterns is constituted by a pair of a reception IP address and a reception port number (step S402).

When the destination IP address and destination port number of the received packet do not correspond to a reception IP address and a reception port number constituting a WOL pattern as a result of the judgment in step S402, the process returns to step S401. On the other hand, when the destination IP address and destination port number of the received packet correspond to a reception IP address and a reception port number constituting a WOL pattern, the controller 103 is electrified (step S403), and the process ends.

Figure 8:
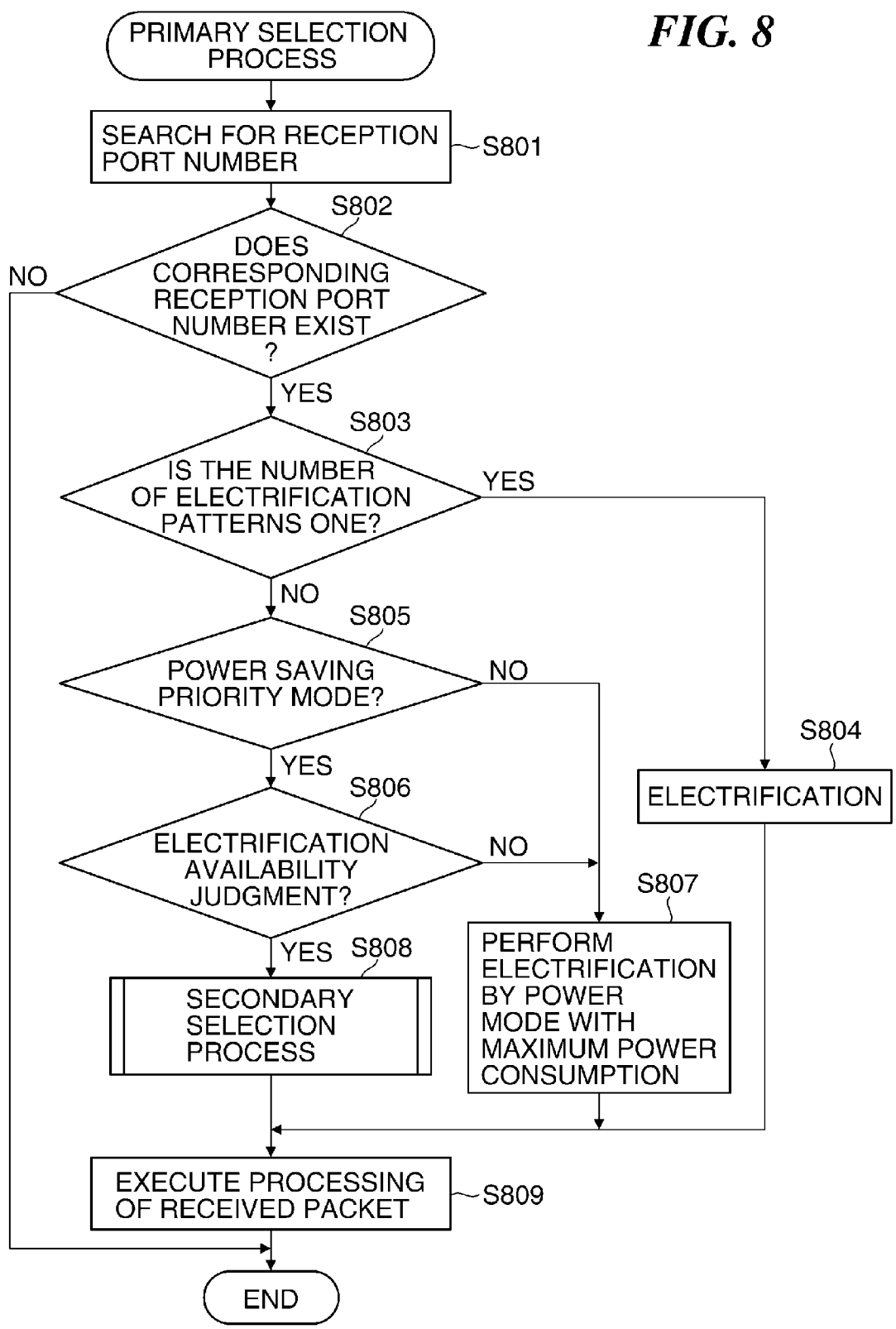
FIG. 8 is a flowchart showing a procedure for a primary selection process executed by a primary selection processing section in FIG. 2.

FIG. 8 is a flowchart showing a procedure for a primary selection process executed by the primary selection processing section 212 in FIG. 2.

The primary selection process in FIG. 8 is also executed when a packet is received. In FIG. 8, the primary selection processing section 212 searches for a reception port number corresponding to a destination port number which the received packet has, from among the reception port numbers of the multiple WOL patterns stored in the WOL pattern storage section 222 first (step S801), and judges whether the corresponding reception port number exists or not (step S802).

When the corresponding reception port number does not exist as a result of the judgment in step S802, the process ends. On the other hand, when the corresponding reception port number exists, the primary selection processing section 212 refers to the electrification pattern table 215 and judges whether the number of electrification patterns 405 set for the received packet is one or not (step S803).

When the number of electrification patterns 405 is one as a result of the judgment in step S803, components of the image forming apparatus 101 are electrified on the basis of a power mode corresponding to a relevant electrification pattern 406 (step S804) to execute processing of the received packet (step S809), and the process ends. On the other hand, if the number of electrification patterns 405 is not one (if multiple usable power modes are set) (step S803: NO), the primary selection processing section 212 judges whether the power saving priority mode is set or not (step S805).

When the power saving priority mode is not set as a result of the judgment in step S805, the image forming apparatus 101 is electrified by a power mode in which the largest number of components of the image forming apparatus 101 are electrified (a power mode with the maximum power consumption) among power modes corresponding to the multiple set electrification patterns (step S807) to execute processing of the received packet (step S809), and the process ends. On the other hand, when the power saving priority mode is set (step S805: YES), the primary selection processing section 212 judges whether electrification availability judgment 404 set for the received packet is "YES" or not (step S806).

When the electrification availability judgment 404 is "NO" as a result of the judgment in step S806, the process proceeds to step S807. On the other hand, when the electrification availability judgment 404 is "YES", the primary selection processing section 212 instructs the secondary selection processing section 213 to execute the secondary selection process in FIG. 9 to be described later. If the secondary selection processing section 213 executes the secondary selection process, the content of communication of the received packet is analyzed, and the image forming apparatus 101 is electrified by a power mode in which components required for executing processing of the packet are electrified, for example, by the optimum power mode described above (step S808) to execute processing of the received packet (step S809), and the process ends.

Figure 9:
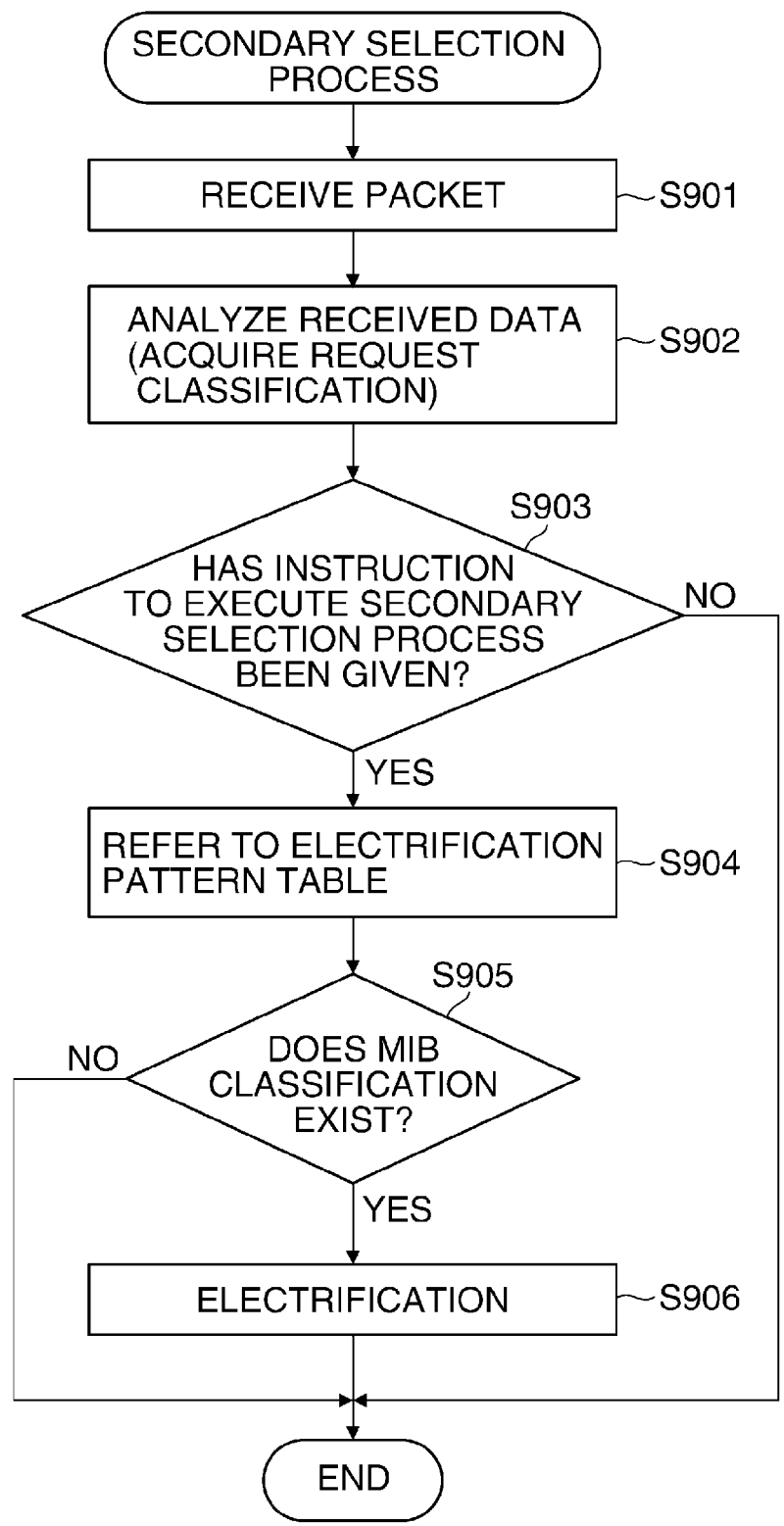
FIG. 9 is a flowchart showing a procedure for a secondary selection process executed in step S808 in FIG. 8.

FIG. 9 is a flowchart showing a procedure for the secondary selection process executed in step S808 in FIG. 8.

The secondary selection process in FIG. 9 is executed by the secondary selection processing section 213 in FIG. 2. In FIG. 9, the secondary selection processing section 213 receives a packet first (step S901), analyzes MIB information, which is the content of the data section of the received packet, to acquire MIB classification 502 (step S902) and judges whether the secondary selection processing section 213 has been instructed by the primary selection processing section 212 to execute the secondary selection process or not (step S903).

When the secondary selection processing section 213 has not been instructed by the primary selection processing section 212 to execute the secondary selection process as a result of the judgment in step S903, the process ends. On the other hand, when the secondary selection processing section 213 has been instructed by the primary selection processing section 212 to execute the secondary selection process (step S903: YES), the secondary selection processing section 213 refers to the electrification pattern table 216 (step S904) and judges whether the acquired MIB classification 502 is included in the electrification pattern table 216 or not (step S905).

When the acquired MIB classification 502 is not included as a result of the judgment in step S905, the process ends. On the other hand, when the acquired MIB classification 502 is included, components of the image forming apparatus 101 are electrified on the basis of a power mode shown as an electrification pattern 503 corresponding to the MIB classification 502 (step S906), and the process ends.

According to the processes in FIGS. 8 and 9, if the number of electrification patterns 405 set for a received packet is larger than one (step S803: NO), MIB information, which is the content of the data section of the received packet, is analyzed to acquire MIB classification 502 (step S902), and components of the image forming apparatus 101 are electrified on the basis of a power mode shown as an electrification pattern 503 corresponding to the acquired MIB classification 502 (step S906).

Thereby, it is possible to prevent a power mode in which unnecessary components are electrified from being selected and, therefore, sufficiently save consumption power. Further, since MIB information is information which a packet is usually provided with, it is possible to eliminate necessity of giving special data to a packet to identify a power mode.

Further, according to the process in FIG. 8, a reception port number corresponding to a destination port number which a received packet has is searched for (step S801). Since a destination port number is information which a packet is usually provided with, it is possible to eliminate necessity of giving special data to a packet to identify a power mode.

Furthermore, according to the process in FIG. 8, when the power saving priority mode is not set (step S805: NO), or the electrification availability judgment 404 set for a received packet is "NO" (step S806: NO), the image forming apparatus 101 is electrified by a power mode in which the largest number of components of the image forming apparatus 101 are electrified (a power mode with the maximum power consumption), among power modes corresponding to multiple electrification patterns (step S807).

In other words, at least all components that may be possibly used when processing of a packet is executed are certainly electrified, it is possible to certainly avoid occurrence of a situation in which processing of the packet is not executed because unelectrified components exist at the time of processing the packet.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-108004, filed May 26, 2014, which is hereby incorporated by reference wherein in its entirety.

What is claimed is:

1. An information processing apparatus, comprising:
a controller including a processor and a memory;
a power controller which shifts the information processing apparatus to a power saving state in which power supply to the processor is stopped; and
a network interface which receives a packet transmitted from an external device while the information processing apparatus is in the power saving state, the network interface instructing the power controller to supply power to the processor and transmitting the received packet to the controller in a case where the received packet is a specific packet,
wherein the controller determines a power state to which the information processing apparatus is to shift on a basis of a port number of the received packet, and, in a case where the power state to which the information processing apparatus is to shift is unable to be determined on the basis of the port number of the received packet, analyzes a content of the received packet to determine the power state to which the information processing apparatus is to shift on the basis of a result of the analysis.

2. The information processing apparatus according to claim 1,
wherein the packet has a data section; and
wherein the controller analyzes the data section to determine the power state to which the information processing apparatus is to shift.

3. The information processing apparatus according to claim 2, wherein the controller analyzes management information base (MIB) information to determine the power state to which the information processing apparatus is to shift.

4. The information processing apparatus according to claim 1,
wherein the processor identifies an application which is to execute processing of the received packet on the basis of the port number of the received packet, and
wherein the power controller supplies power to a unit identified as necessary for executing the processing of the received packet by the application on the basis of an instruction by the application.

5. The information processing apparatus according to claim 1, wherein when the processing of the received packet is executed, one of a first mode in which priority is given to the processing of the received packet over the analysis of the content of the received packet or a second mode in which priority is given to the analysis of the content of the received packet over the processing of the received packet is selected.

6. A control method of controlling an information processing apparatus which comprises a controller, including a processor and a memory, and a power controller which shifts the information processing apparatus to a power saving state in which power supply to the processor is stopped, the method comprising:
receiving a packet transmitted from an external device while the information processing apparatus is in the power saving state;
instructing the power controller to supply power to the processor;
transmitting the received packet to the controller in a case where the received packet is a specific packet;
determining a power state to which the information processing apparatus is to shift on a basis of a port number of the received packet; and
in a case where the power state to which the information processing apparatus is to shift is unable to be determined on the basis of the port number of the received packet, analyzing a content of the received packet to determine the power state to which the information processing apparatus is to shift on the basis of a result of the analysis.

7. A computer-readable non-transitory storage medium storing a program for causing a computer to implement a control method of controlling an information processing apparatus which comprises a controller, including a processor, and a power controller which shifts the information processing apparatus to a power saving state in which power supply to the processor is stopped, the method comprising:
receiving a packet transmitted from an external device while the information processing apparatus is in the power saving state;
instructing the power controller to supply power to the processor;
transmitting the received packet to the controller in a case where the received packet is a specific packet;
determining a power state to which the information processing apparatus is to shift on a basis of a port number of the received packet; and
in a case where the power state to which the information processing apparatus is to shift is unable to be determined on the basis of the port number of the received packet, analyzing a content of the received packet to determine the power state to which the information processing apparatus is to shift on the basis of a result of the analysis.

* * * * *